(12) United States Patent
Hoffmann

(10) Patent No.: US 6,233,218 B1
(45) Date of Patent: May 15, 2001

(54) DEVICE FOR STORAGE AND DISPENSING OF EQUALLY SHAPED DISCS, OR DISC-SHAPED ELEMENTS MOUNTED IN ONE OR MORE PILES

(76) Inventor: Alex Hoffmann, Hoffmann MeBtechnik GmbH, Schlossstrasse 32a, 69231 Rauenberg (DE)

( * ) Notice: Subject to any disclaimer, the term of this patent is extended or adjusted under 35 U.S.C. 154(b) by 0 days.

(21) Appl. No.: 09/222,897

(22) Filed: Dec. 30, 1998

(30) Foreign Application Priority Data

Jan. 2, 1998 (DE) ............................................. 198 00 051

(51) Int. Cl.$^7$ ..................................................... G11B 17/04
(52) U.S. Cl. ............................................................ 369/178
(58) Field of Search ........................... 369/36, 178, 77.1, 369/75.1

(56) References Cited

U.S. PATENT DOCUMENTS

| | | | |
|---|---|---|---|
| 5,322,270 | * | 6/1994 | Belanger et al. ..................... 271/187 |
| 5,872,748 | * | 2/1999 | Shindo et al. .......................... 369/38 |
| 6,097,693 | * | 8/2000 | Nakamichi ............................ 369/270 |

FOREIGN PATENT DOCUMENTS

| | | | |
|---|---|---|---|
| 4223813 C1 | * | 12/1993 | (DE) . |
| 1101431 | * | 10/1955 | (FR) . |
| 6-36435 | * | 2/1994 | (JP) . |
| 6-195848 | * | 7/1994 | (JP) . |

* cited by examiner

*Primary Examiner*—William R. Korzuch
*Assistant Examiner*—Julie Anne Watko
(74) *Attorney, Agent, or Firm*—Anderson, Kill & Olick P.C.

(57) ABSTRACT

In a device for storage and dispensing of equally shaped discs or disc-shaped elements mounted in one or more piles having a center bore and contained in a housing or frame in which threaded spindles are positioned (parallel to each other and the axis of the pile) around the piled discs with the outer rim of the disk lying inside the grooves of the threaded spindles so that the discs move along the pile axis by synchronously turning the spindles and having a manipulator to feed in or release a disc into a desired position, the improvement characterized in that the threaded spindles have a region or two regions in which the threads of the spindle vary in pitch and preferably also in diameter. This is achieved in case of a single-pile by increasing the pitch and the outer diameter of the thread of the spindles in the center region compared to the rest of the spindle, whereas for the two-pile version the end portions of the spindles vary in pitch and outer diameter. The core diameter is always constant.

19 Claims, 5 Drawing Sheets

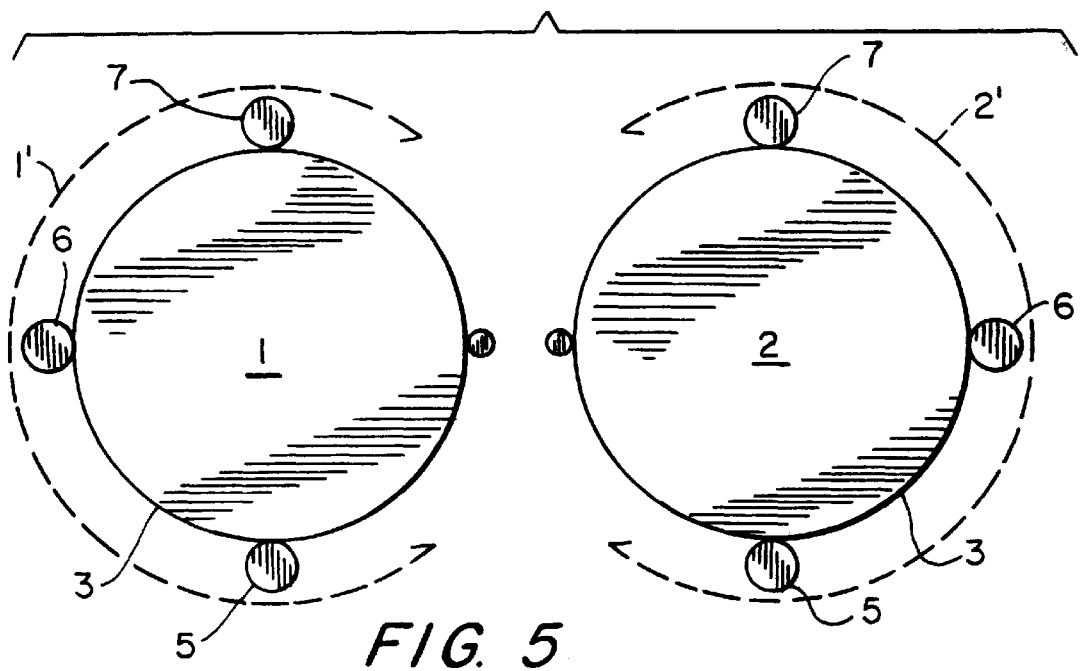
FIG. 5
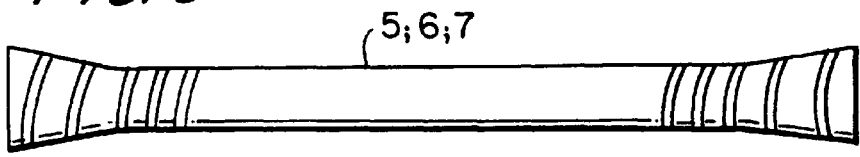
FIG. 6
FIG. 7
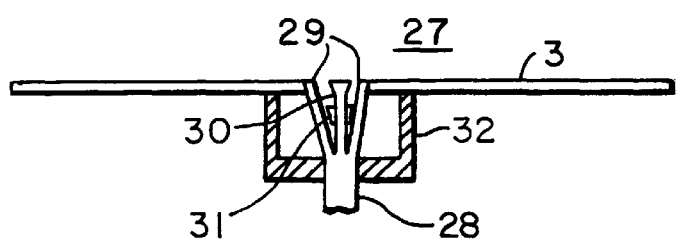

DEVICE FOR STORAGE AND DISPENSING OF EQUALLY SHAPED DISCS, OR DISC-SHAPED ELEMENTS MOUNTED IN ONE OR MORE PILES

FIELD OF THE INVENTION

The invention relates to an improved device for the storage and dispensing of equally shaped discs or disc-shaped elements mounted in one or more piles.

BACKGROUND OF THE INVENTION

A device of this kind is described in German Patent No. DE 42 23 813 C1. However the device taught in this patent employs spindles with uniform threads over the whole length of each spindle for dispensing disks from an arrangement of parallel piles of disks. The construction of the spindle is considered a shortcoming of the device for carrying out the function of releasing and feeding discs (disc-shaped elements) from one pile of the parallel mounted piles to another. This shortcoming is attributable to the movement of the spindles which are highly non-uniform, and similar to the movement of a film in a projector. The discs in one pile are withdrawn by a manipulator one disk at a time with the foremost disc transported from a given one pile to an adjacent pile which is moved by one position to provide room for the next disc. The feeding pile is moved again by one position and the manipulator moved back to permit movement of the next disc and so on, until a desired disc for release to a player is at the foremost position.

It is evident that a compromise is being made between the wish to store as many discs as possible in a given space and the need to cope with the tolerances of the discs (and the spindles). Furthermore, in the above cited patent two threaded spindles having a left and right thread orientation rotate in opposite directions which further complicates the operation.

The kernel of the present invention resides in a spindle construction which is applicable to a one or two pile model of disks arranged in tandem so that the spindle is arranged to feed and release the discs from the piles to optimize storage and feeding. This is accomplished in accordance with the present invention by making the thread pitch and diameter of the thread of the spindles narrow in one region where the discs are intended only to be stored, and wider in another region where the discs are intended to move. The change of the thread pitch and diameter is done gradually from opposite ends of the spindle for use in the two-pile model and from the center for the single-pile model. For example, when using standard CD's "(compact discs")" of thickness 1.2 mm a tolerance of 40% in thickness of the critical outer rim region is allowable for a number of up to 300 CD's in a single pile of 600 mm length (standard rack depth). In a two-pile model the movements are even more linearized and errors during feeding and releasing are mostly removed.

The construction of the device of the present invention is simplified by using a separate motor for each pile of disks with independent position sensors and using the same spindle construction on both sides i.e. same orientation of threads for the two-pile model arrangement of disks. The allowed tolerances of the disk elements, of for example audio CD's, each having an outer diameter of 120 mm±0.3 mm and a thickness of 1.2 (+0.3/−0.1) mm will dictate the form of the spindles. According to the invention, when the disk elements are CD's, the thread pitch of the spindles in case of a single-pile model will vary in the center region of the spindle whereas in the case of a two-pile model the thread pitch will vary from 3 mm (+0.3) at the opposite ends with the height of the threads varying over the valley of 1.5 mm (±0.2).

SUMMARY OF THE INVENTION

High storage density and high tolerance of the disc-shaped elements are achieved according to the present invention. The elements (discs) are moved in the plane of their orientation such that in the case of a single-pile version the elements are moved along a curve and in the case of the two-pile version along a straight line.

BRIEF DESCRIPTION OF THE FIGURES

FIG. 5 shows similar view to that of FIG. 1 for a two-pile version with 3 threaded spindles and one rod for each side, arranged so that the rods face each other directly;

FIG. 6 shows one of the six spindles of FIG. 5 from the side over the whole length;

FIG. 7 shows the essential part of a sledge member to transports the discs from one pile to the neighboring pile and an outside circular clamp, a wedge-shaped bolt and a centering bell-shaped part.

DETAILED DESCRIPTION OF THE INVENTION

The invention is described on the basis of two examples one for a single pile of disks and one for two piles of disks in which equal elements in the different figures have the same reference numbers.

Figure 1:
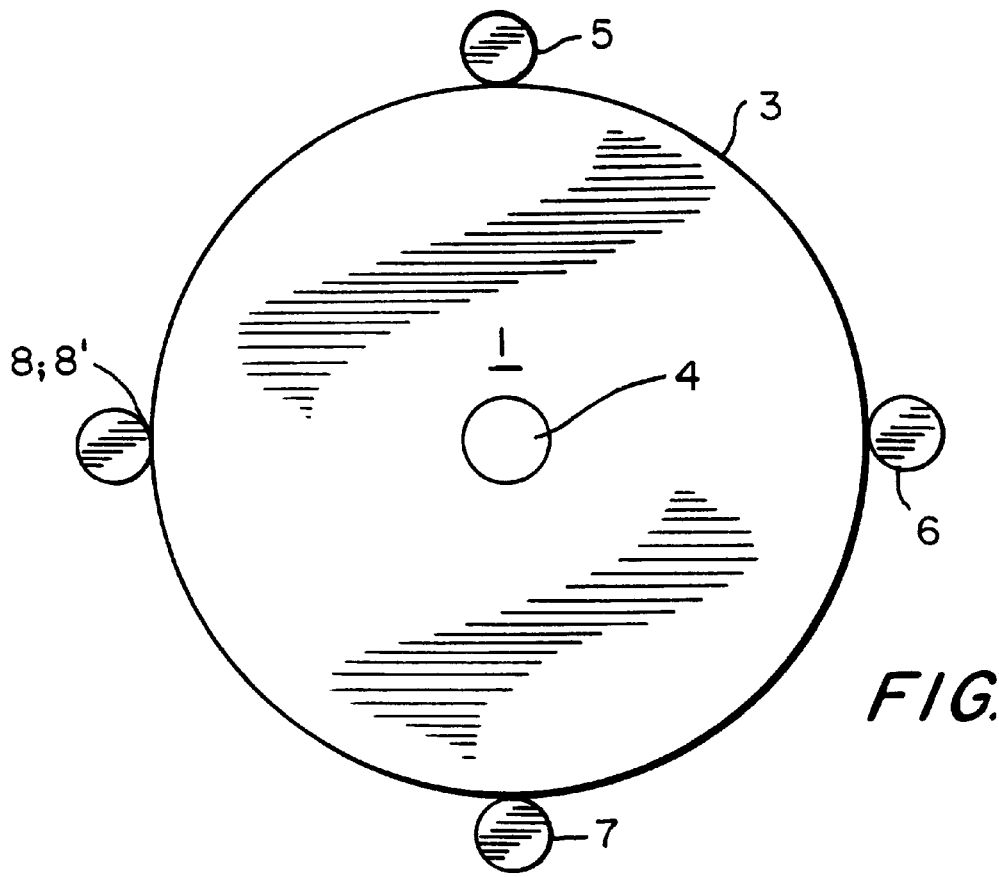
FIG. 1 shows a top view of a single-pile of disks in an axial direction with the disks shown held together by 4 threaded spindles, or 3 spindles and one rod which are symmetrically positioned around the circumference of the pile of discs.
Figure 2:
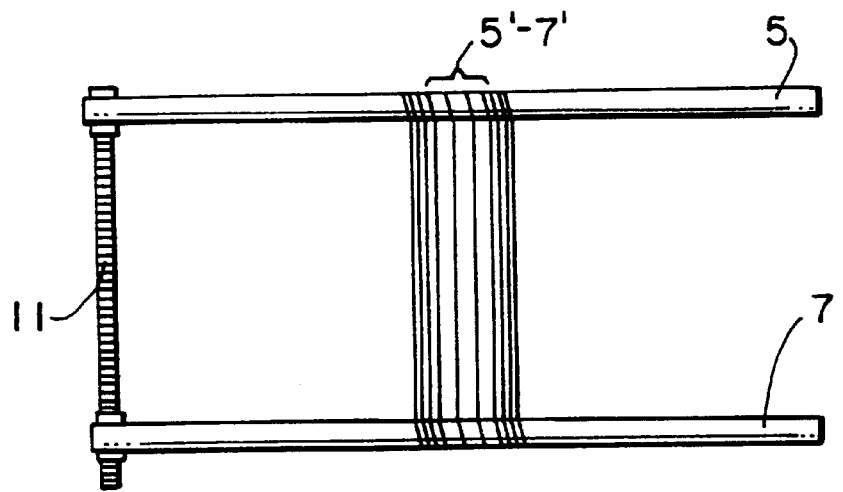
FIG. 2 is a side view of the arrangement shown perpendicular to the pile of disks with the spindles 6 and 8 of FIG. 1 omitted for clarity.

The single-pile of equally shaped discs as shown in FIG. 1 can represent a pile of magnetooptical discs, CD's, DVD's or alike and are arranged in tandem on a concentric axis with the center of each disc having a circular bore 4 of precise diameter. The circumference of the pile of disks is held secure by three spindles 5, 6 and 7 symmetrically positioned 90° apart from each other. The spindles 5, 6 and 7 lie parallel to each other and extend over the length of the pile of disks. The fourth spindle 8 lies in position 8' and is a spindle cut in half through the center. One half of this spindle 8 is synchronously driven together with the other three spindles 5, 6 and 7 by means of a synchro-belt 11 as shown in FIG. 2. The other half is driven either synchronously during movement of the pile or asynchronously before feeding or releasing a disc. The discs or disc-shaped elements 3 lie with their outer edge in the grooves of the threads of spindles 5 to 8 so that the whole pile of disks is moved in unison when the spindles rotate synchronously to the one or the other side, depending on the direction of rotation. Another modification is to use a polished rod 8 in the position 8'. In such case the rod 8 is not rotated and its purpose is only to keep the discs from falling out of the device. The discs just slide along it.

The construction of the spindles 5 to 7 and 8 is of importance and vary based on whether the disks are mounted in one pile or two. In the single-pile arrangement, the threads on the spindles have more turns, preferably at least twice as many turns as the number of discs to be stored, precisely 2 N–1, if N is the number of discs 3.

The essential point is that the thread pitch of the spindles 5 to 7 is not constant, i.e., not only is the pitch non-uniform, but the diameter of the threads vary so that in the center region 5' to 7' of the spindles 5 to 7 the thread pitch will be different from the thread pitch at the left and right ends of the center region. Moreover, the diameter of the threads is increased to vary directly with the variation in pitch. In this way the discs are spaced wider in the center region, for examples 3 mm in the case of ordinary CD's that are 1.2 mm thick, so that an unobstructed safe handling is possible. To move the pile in unison the spindles 5 to 7 or 8' are turned synchronously and the pile moves like a nut until the disc to be released from the pile is exactly in the center position.

Figure 3:
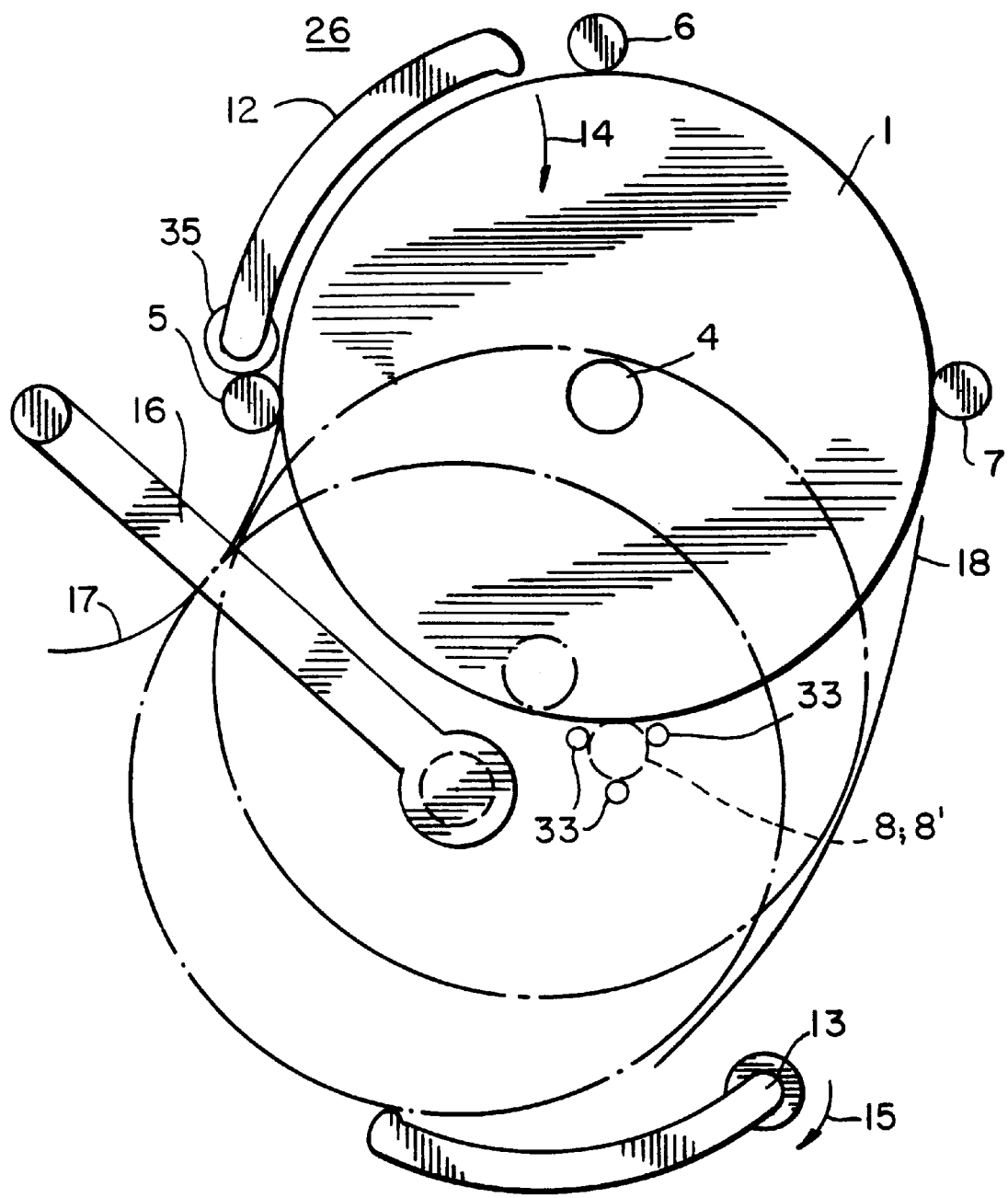
FIG. 3 shows a manipulator for the moving a single-pile version of disks with the manipulator consisting of a sliding member, gripping arm and fingers.

A disc 3 in a pile of disks is handled by a manipulator 26 which is shown in FIG. 3 for use with a single-pile of disks. To move one disc (disc-shaped element) out from the pile, a finger 12 of thickness 2 mm (e.g.) in the manipulator 26 is turned around the center 35 in the direction of arrow 14 into the pile at the center position 9 (of FIG. 8.) A second finger 13 in the manipulator 26 serves as a counter handle which is turned in the direction of arrow 15 to oppose moving the disc out. Finger 12 is bow-shaped approximately 70% of a quarter-circular ring around disc 1, with a minimal length equal to the radius of the disk. In the starting position finger 12 is located in the free space between the spindles 5 and 6 along the circumference of the disc (disc-shaped element) 3. The finger 12 moves the disc by a turn of approximately 90° to bring the center bore 4 outside the rim of the pile by at least twice the bore's diameter. At this position the manipulator arm 16 grips the disc and moves it completely out of the pile onto a player (not shown) such as a CD-player, with the type of player depending on the type of disc used. During this movement the disc-shaped element is sliding along guide rails 17 and 18 that are in fixed positions related to the rest of the pile 1.

Figure 4:
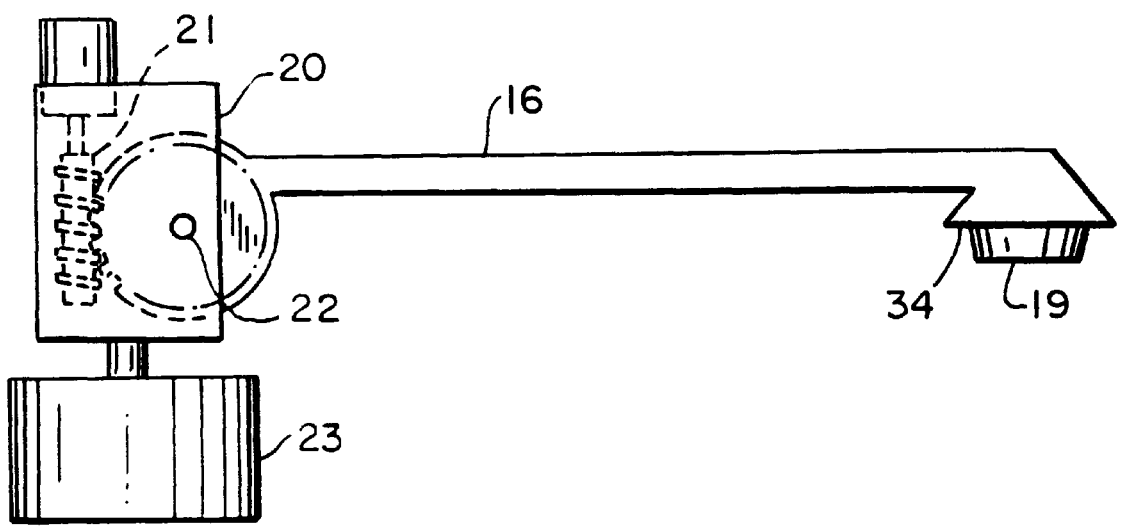
FIG. 4 shows the gripping arm of FIG. 3 from the side view with a vertical and horizontal drive mechanism.

The manipulator arm 16 and its function is hereinafter described in detail in connection with the FIG. 4. At the free end of the arm 16 there are elastic fingers 19. Alternatively an inflatable rubber head can be used for the same purpose. The manipulator arm 16 is moved by means of a rocking/lifting mechanism comprised of a worm gear 21 such that the arm 16 swings about the axis 22 in a plane perpendicular to the plane that is formed by the disc (disc-shaped element) 3. By means of this lifting mechanism the fingers 19 or in the alternative an inflatable head is brought inside the center bore 4 (FIG. 1) of the disc to the starting point that is defined by the stop ring 34. In this position the fingers 19 open, or the rubber head is inflated respectively so that the arm 16 and the disc 3 are firmly held tight together. In the plane of the disc the motor 23 turns the arm 16 out of the pile by a minimum of 45° (typically by 90°). This plane is in the direction of sight as shown in FIG. 4. To make a 90° turn of the disc possible, the half-cut rod 8 is opened to allowing a side movement in the direction of the axis of 8 or 8' of a distance of about twice the thickness of the disc (disc-shaped element). The split rod i.e., half-cut rod 8 splits into halves having mating centering elements that are not shown in detail. After the splitted rods have opened, finger 12 turns and moves out the selected disc for the first step, then the arm 16 connects to the center bore and continues this movement until the disc is free and can be placed onto a player etc. This movement is shown in FIG. 3 by the dashed line 9 of the intermediate positions of the disc 3.

When using a splitted spindle at position 8'—instead of a rod, its movement for releasing a disc is as follows: The two halves may also have mating centering ends that make it look like one piece at the beginning, but when the chosen disc is in center position 9 (of FIG. 8) the splitted spindle opens. In this case it moves by turning the right half asynchronously to the left (in FIG. 9) by one or two turns so that this part of spindle 8' screws along the ceased pile 1 and gives way equal to a distance of 2 times the thickness of the disc causing a movement similar to that described above for the split rod. The splitted spindle 8' must be stabilized on both sides of the center position for example by three small supporting wheels 33 at either side.

An example of the invention is shown in FIGS. 5 to 7 using two parallel piles of disks 1 and 2 with each of the two piles supported by at least three spindles 5, 6, 7 mounted parallel to each other in radial positions circumferentially surrounding the piled discs (disc-shaped element). For the left pile in FIG. 5 the spindles are positioned at the 180°, 270° and 360° positions around the pile and for the right pile in FIG. 5 the spindles are positioned at the positions 0°, 90° and 180° around the pile. Thus the open sides (that means the sides that are not blocked by a spindle) are facing each other exactly. This is substantial for a simple movement of one disc 3 between the two piles on a straight line. For each pile the three spindles move synchronously, driven for example by a synchro-belt.

In FIG. 6 the shape of each of the spindles 5 to 7 is shown with each spindle threaded in a region having a thread diameter and pitch which is not uniform over its length. The spindles widen in thread pitch and outer diameter at each opposite end of the spindle but has a constant thread diameter and pitch over the whole middle part of the spindle where the thread and pitch is uniform.

FIG. 7 shows the construction of the manipulator 27 for a two pile model, which is different from the manipulator 26 for a single-pile version. In the case of two piles, the manipulator 27 has the function of moving one disc after the other between the two piles until the desired disc is at the foremost position. Only then does the manipulator stop in the middle of its movement and then moves in direction of the axis of the piles backward. The manipulator 27 includes as essential parts: an outside clamp 28 that has elastic fingers 29 that grips inside the bore 4 of the disc (disc-shaped element) 3. The manipulator 27 also has a movable conical bolt 31 which lies in the center of the elastic fingers 29. The force with which the fingers 29 grip into the bore of the disk element 3 is determined by the deepness to which the conical bolt 31 is driven.

The clamp 28 has a shaft which is centered in a bell-shaped part 32, that touches the disc 3 at its edge for supporting the disc 3 in a plane (perpendicular to the axis of the shaft) when the fingers 29 are open. The movement of the disc (disc-shaped element) is preferably in the plane of the discs in the pile and along a straight line that connects the centers of the two neighboring piles 1 and 2.

Figure 8:
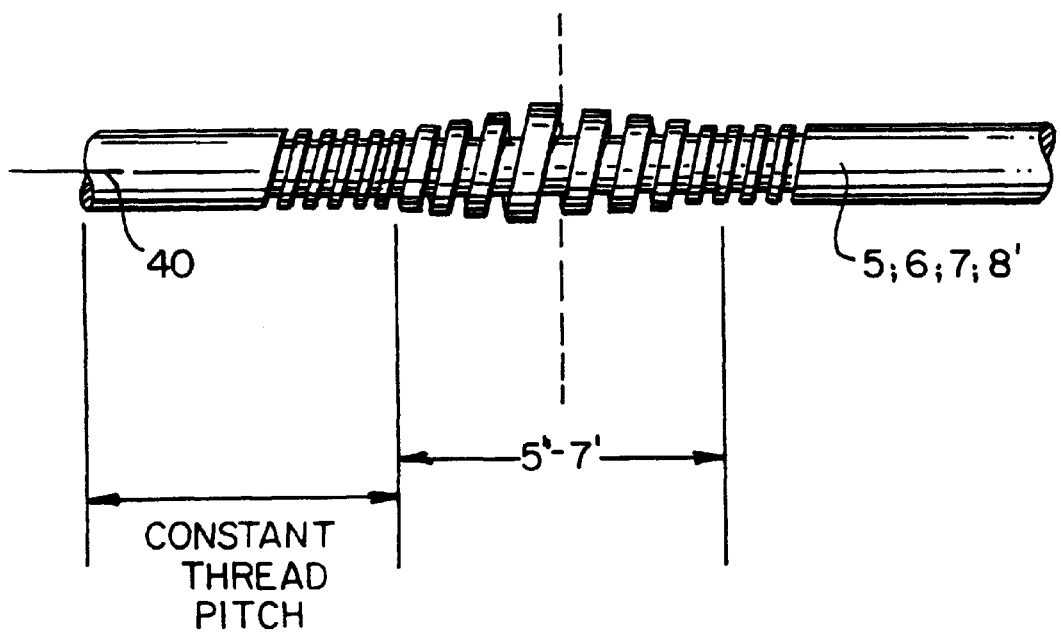
FIG. 8 shows (only) the center part of a threaded spindle for the single-pile version of the device.

Because of the importance of the shape of the spindles to this invention it is again restated that the middle part 5'–7' of the spindle as shown in the FIG. 8 embodiment for the single-pile version and for best performance (low fail rate) of feeding and releasing of discs in and out of the pile, the spindles should have an increased thread pitch in its central region by approx. a factor of 1.5 to 2.5 over the thread pitch outside of this region (the actual thread pitch depending on the thickness of the discs) and also a similarly increased outer diameter (thickness) of the thread at the center in this region in proportion to the variation in thread pitch. The inner (core) diameter of the threaded spindles is constant over the whole length.

Figure 9:
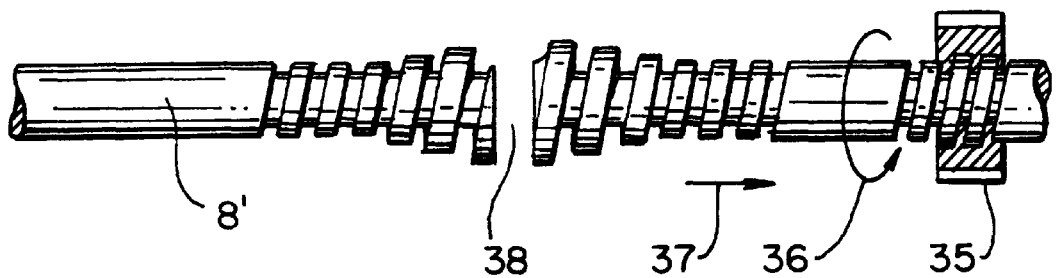
FIG. 9 shows the same as FIG. 8 but in a version where the spindle can be opened for the purpose of feeding and releasing discs at that point, if the arrangement of FIG. 1 is used.

In FIG. 9 the splittable spindle 8' is shown in the splitted position, the latter is marked in FIG. 8 by the dashed line 9. For splitting the spindle, there is a nut 35 screwed onto the right hand part of spindle 8' having the same thread pitch as the spindle in this part. This nut can turn either synchronously with the spindle 8' or it will stall while the right hand part of spindle 8' turns. For feeding or releasing discs out of the pile, nut 35 stalls, and spindle 8' is turned alone for one or two turns, while all the other spindles 5,6,7 and the left part of spindle 8' stand still. This causes movement in the direction of arrow 37 resulting in a gap 38. As the right hand part of spindle 8' turns and not just moves straight to the right, discs in the right part of the pile are not bent, but kept in place. Only if the pile is meant to move as a whole will this half of the spindle and also the nut 35 turn synchronously with all the other spindles in the same direction. If a disc is meant to be fed in or released out, nut 35 is blocked (with respect to the housing frame).

It should be understood that in the case of the two-pile version of the invention a standard stepping motor is used for each pile which is omitted in the drawings for clarity and which moves the pile up and down along its axis via a synchro-belt. In case of a single-pile version another standard motor is used such as a servo motor to move the right hand part of spindle 8' asychronously or alternatively a polished rod 8 to open the gap that makes possible a disc to be released or fed into the pile. A motor or a turning magnet 35 is used to turn finger 12 in FIG. 3 to move a disc out of the pile. A lifting motor 20 is used for moving the grabber 16 into the bore 4 of the disc (disc-shaped element) and a turning magnet 23 is used to move the motor 20 and grabber 16 to move the disc in and out of the pile and to a player or the like.

What is claimed is:

1. In a device for the storage and dispensing of equally shaped disc-shaped elements arranged in one or two piles enclosed by a frame with each disk having a central bore and with each pile of disks supported by an arrangement of parallel oriented threaded spindles surrounding the circumference of the pile and having a length at least equal to the length of the pile for moving the pile as a whole while the spindles are synchronously driven until one disc shaped element has arrived at a position to be dispensed from the pile, the improvement characterized in that the threaded spindles have at least one region in which the threads of the spindle vary in both pitch and diameter and wherein the spindle has a core of substantially constant diameter over the length of the spindle.

2. In a device as claimed in claim 1, wherein the diameter of the threads vary in said region in direct proportion to the variation in pitch.

3. In a device as claimed in claim 2, wherein said region is in the center of said spindle.

4. In a device as claimed in claim 2, wherein said region lies at each opposite end of said spindle.

5. In a device according to claim 4, characterized in that the threaded spindles are symmetrically positioned in equal angular distances around each pile within an angular range of 0° to 180° with an open side of each of the piles directly facing the open side of each other pile and with the threaded spindles facing each other.

6. In a device according to claim 2, having three threaded spindles positioned at 90° to each other and a fourth threaded spindle or polished rod which is not turned at all, and is cut in half with one half driven synchronously with the other spindles, and with the other half driven either synchronously or asynchronously.

7. In a device according to claim 6, characterized by the addition of a centering cone for the fourth threaded spindle or the split polished rod at the cut point with the movable half of the rod driven axially.

8. A device according to claim 7, characterized in that the split rod is additionally supported by rolls on either side of the cut.

9. In a device according to claim 7, wherein the threaded spindles have a number of threaded turns above the number of discs in the pile to be managed.

10. A device according to claim 6, characterized in that the split rod is additionally supported by rolls on either side of the cut.

11. In a device according to claim 1, wherein each spindle has a middle and two ends, wherein the pitch of the spindles lie between 140% and 180% of the net thickness of the discs in a uniform range of the pile and between 180% and 350% in either the middle or at each end the spindle.

12. In a device according to claim 11, wherein the threaded spindles have a number of threaded turns above the number of discs in the pile to be managed.

13. In a device according to claim 1, further comprising a manipulator comprising a first finger 12 that moves a selected disc from a pile thereof clockwise along sliding rails out of the pile, a second finger that moves counter-clockwise to stabilize the outgoing movement, and a gripping arm that grips the disc at its center bore and moves the disk completely out of the pile.

14. In a device according to claim 13, wherein the first finger has a driving and holding axis that runs parallel to the axes of the spindles and is of a curved shape covering approximately one quarter of the circumference of the discs.

15. In a device according to claim 13, wherein the manipulator has two degrees of freedom and one turning axis.

16. In a device according to claim 15, wherein the manipulator is equipped with elastic fingers to grip inside the bore of the disc.

17. In a device according to claim 13, for use with two piles in which the manipulator directly connects the centers of both piles and grabs the discs at their center bore for straight movement.

18. In a device according to claim 17, further comprising a circular clamp having a plurality of elastic members 29 which is operated by moving a conical piston inside the fingers to open or close the clamp in order to grip the bore of the discs.

19. In a device according to claim 18, wherein the clamp has a shaft centered inside a bell-shaped part which touches the disc for holding the disc in a plane perpendicular to the axis of the shaft.

* * * * *